United States Patent [19]

Köster

[11] Patent Number: 4,715,358

[45] Date of Patent: Dec. 29, 1987

[54] AUTOMATIC CONTROL OF INCIDENT SOLAR FLUX

[76] Inventor: Helmut Köster, Karl-Bieber-Höhe, 6000 Frankfurt am Main, Fed. Rep. of Germany

[21] Appl. No.: 814,513

[22] PCT Filed: Jun. 9, 1980

[86] PCT No.: PCT/DE80/00088

§ 371 Date: Feb. 2, 1981

§ 102(e) Date: Feb. 2, 1981

[87] PCT Pub. No.: WO80/02712

PCT Pub. Date: Dec. 11, 1980

Related U.S. Application Data

[63] Continuation of Ser. No. 232,028, Feb. 2, 1981, abandoned.

[30] Foreign Application Priority Data

Jun. 8, 1979 [DE] Fed. Rep. of Germany ....... 2923233
Jul. 25, 1979 [DE] Fed. Rep. of Germany ....... 2930103
Oct. 29, 1979 [DE] Fed. Rep. of Germany ....... 2942497

[51] Int. Cl.$^4$ ............................................. F24J 2/18
[52] U.S. Cl. ................................. 126/439; 126/429; 126/440
[58] Field of Search ............... 126/439, 428, 431, 429, 126/444, 441, 440; 350/263, 264

[56] References Cited

U.S. PATENT DOCUMENTS

| | | | |
|---|---|---|---|
| 1,747,928 | 2/1930 | Chesney | 350/264 |
| 2,146,816 | 2/1939 | Grassby, Jr. | 350/263 |
| 2,874,611 | 2/1959 | Luboshez | 350/263 |
| 2,874,612 | 2/1959 | Luboshez | 350/263 |
| 4,130,351 | 12/1978 | Luboshez | 350/263 |
| 4,222,370 | 9/1980 | DeGeus | 126/439 |
| 4,223,663 | 9/1980 | Carmichael et al. | 350/263 |
| 4,227,774 | 10/1980 | Corll | 350/263 |

FOREIGN PATENT DOCUMENTS 2827708  1/1979  Fed. Rep. of Germany ...... 126/439

*Primary Examiner*—Henry A. Bennet
*Attorney, Agent, or Firm*—Koda and Androlia

[57] ABSTRACT

Apparatus for automatic control of incident solar radiation consisting of transparent wall elements (2,3) and of opaque elements (7,8). The control is effected by reflection depending on the angle of incidence of the solar radiation. Single walled and multiple walled apparatuses are possible. In a simple two walled apparatus the opaque elements (7,8) are joined to two parallel wall elements (2,3) at an angle α, at least the wall element (2) directed towards the sun being translucent. The opaque elements (7,8) may be flat mirrors or mirrors of a particular shape. The specially shaped mirror sections (94,95) form radiation concentration and emission funnels, wherein absorber pipes may be provided in the radiation emission funnels. The two walled apparatus having flat reflective elements (7,8) between the wall elements (2,3) may be manufactured in a production line. Starting from the roll-off station (150,151,164) the reflective elements (7,8) and the wall elements (2,3) can be welded together and then cut into individual pieces.

15 Claims, 12 Drawing Figures

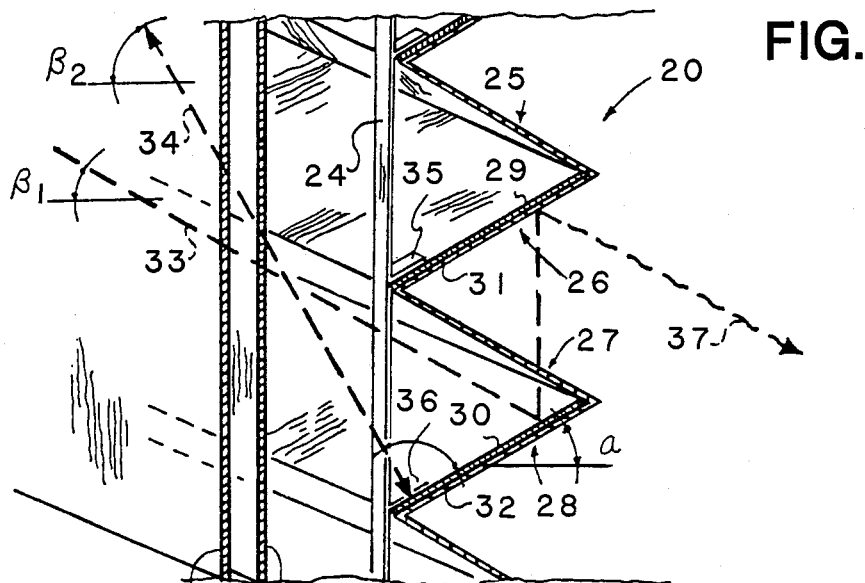
FIG. 3a
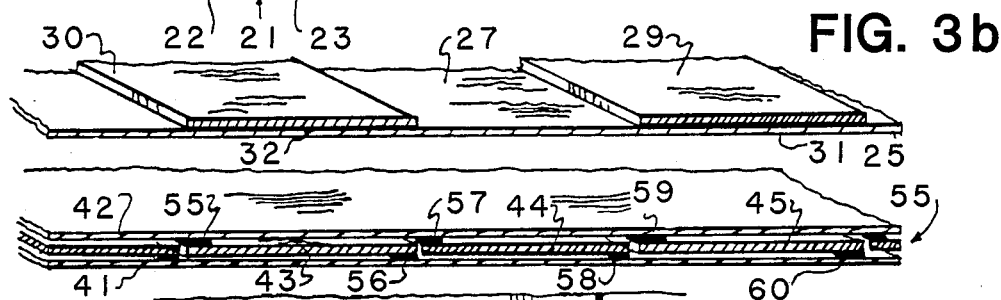
FIG. 3b
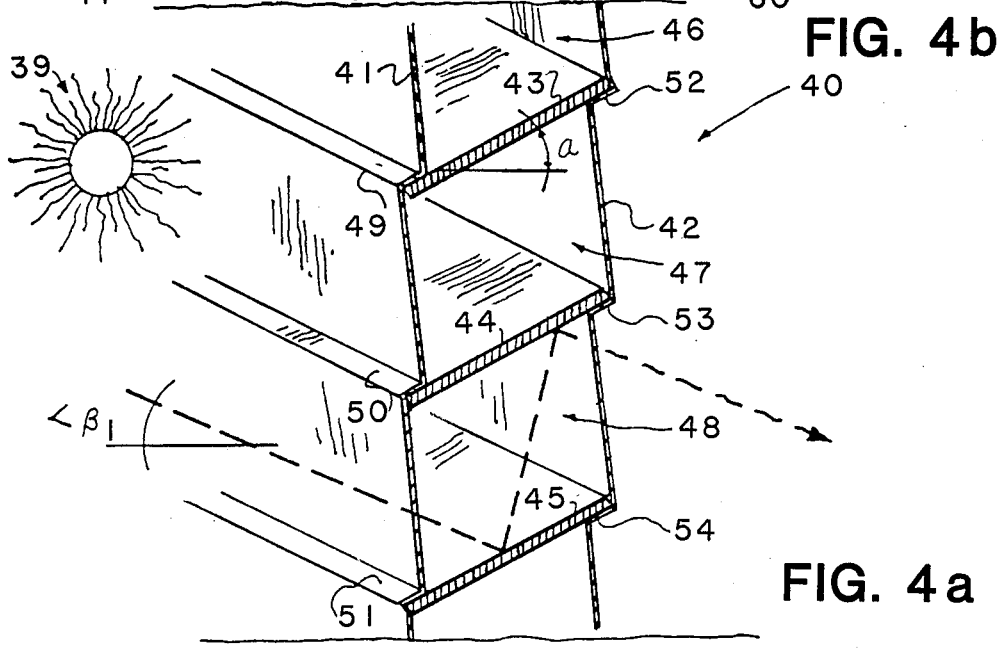
FIG. 4b
FIG. 4a

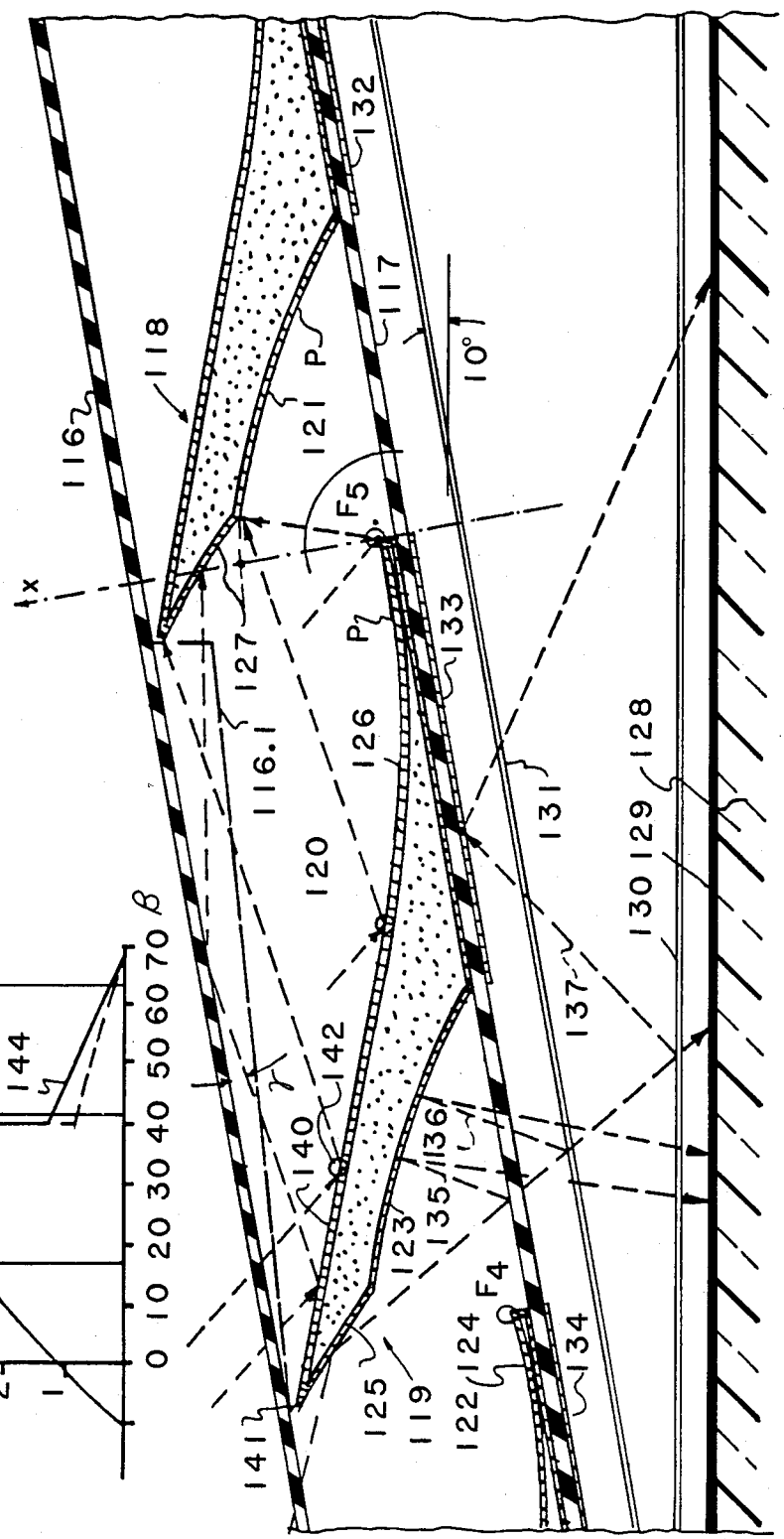
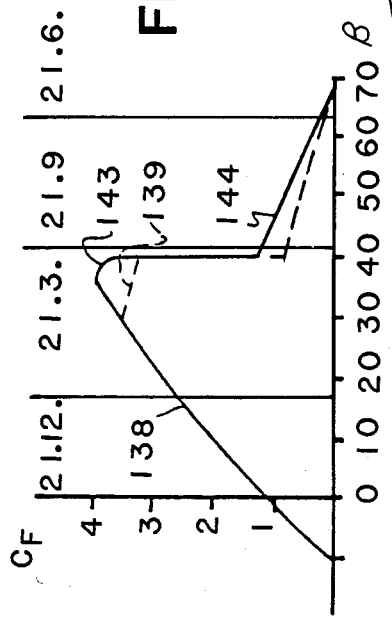
FIG. 7
FIG. 8

AUTOMATIC CONTROL OF INCIDENT SOLAR FLUX

This is a continuation of application Ser. No. 232,028, filed Feb. 2, 1981 now abandoned.

AREA OF TECHNOLOGY OF THE INVENTION

The invention relates to an apparatus for automatic control of incident solar radiation, with essentially transparent wall elements and essentially opaque elements which are arranged horizontally along their long axis and are arranged at intervals from each other on the vertical axis so that light emanating from any one opaque element is not reflected directly back to it by any other opaque element.

STATE OF THE ART

Venetian blinds for shading living areas are already known, consisting of several parallel slats arranged one above the other, and they may be fixed in front of or behind a window. In order to allow the greatest possible amount of daylight to enter the living area and at the same time to prevent the eyes of the people in the room being dazzled, a special conformation of such venetian blinds has been proposed, wherein the slats are provided with a metallic sheen on their upper sides and with a light-absorbing material on their underneath sides, (U.S. Pat. No. 689,474). This configuration however enables undesirable radiation from a window to the interior space and vice versa.

Furthermore there is known a solar collector element for transformation of absorbed solar energy, wherein the absorption surface consists of a vertical wall of parallel, aluminium slats arranged one above the other (German Offenlegungsschrift No. 2522154). These slats are arcuate in shape, so that all the reflected beams fall onto the closest adjacent slat at the time. Thereby all of the incident solar energy is directed onto the absorption surface. As this absorption surface is however opaque it cannot be used for light control.

From the previously lodged application German Offenlegungsschrift No. 2807421, which is however not a prior publication, there is known a device for controlling the climate in a closed space, including a so-called sun blind which reflects the greatest possible part of the sun's rays onto the interior wall of the space. This sun blind consists of triangular elements arranged one above the other which reflect the light towards the exterior when the angle of incidence of the solar radiation is high and when the angle of incidence of the solar radiation is low direct the light onto a narrow absorption surface. With this device light cannot enter the room behind the sun blind. Moreover with the elements arranged in the form of mirrors the light cannot be concentrated onto the absorption surface by double reflection. It follows that only for a very limited range of the angle of incidence is radiation reflected onto the absorption surface, with the result that even with diffuse radiation the room is inevitably darkened.

In another known cover for light admitting apertures, windows and the like, at least partially opaque prism elements are provided on a steeply upwardly inclined surface, wherein the opaque prism surfaces face down into the area to be illuminated (German Offenlegungsschrift No. 2615379). The opaque prism surfaces may be covered with absorptive or reflective coatings and may be located behind and/or in front of a glass wall. When they are located between two panes of glass the prisms are protected from getting dirty, and so the prisms may be made from extruded transparent plastics material. The choice of the angles of the prism surfaces to each other and relative to the horizontal or vertical depends among other things on the critical angle determined according to the geographical latitude. In summer the light falling at a very steep angle of incidence is redirected into the far side of the interior space, while the solar rays falling at a flat angle of incidence are reflected outside. This known form of protection can't be used for cooling in summer or for heating in winter.

Furthermore there is known an apparatus for controlling the passage of heat and light radiation through apertures in buildings, which sets out to prevent the entry of heat from the outside in warm weather and to allow more heat to enter in cooler weather (German Offenlegungsschrift No. 1906990). This apparatus, which permits exact focus onto the sun at azimuth, has tilting wave shaped members which are arranged vertically in columns acting as reflectors and penetrating lamellas. The angle between the lamellas and the horizontal corresponds approximately to the latitude at which the apparatus is to be installed. Manufacture of such an apparatus is very expensive because numerous separate lamellas and tilting wave shaped members are required. A continuous manufacturing process is impossible. Moreover the lamellas cannot serve as static stiffening elements for the glass walls in a wind.

Finally sandwich assemblies made of PVC or polymethylmethacrylate (=PMMA) used for glazing glass houses, industrial buildings and sports complexes, are known (cf. catalogue DD 4 UN 2 "DETALUX" of the Jan. 10th 1978 and also catalogue DP 10 U of the Jan. 15th 1978 of Flachglas AG 8510 Furth). These sandwich assemblies comprise two transparent side walls arranged in parallel and fitted with structures on their surfaces or colours, joined together by means of several bridge pieces which are perpendicular to the side walls. Structures on the surfaces or colourings of this kind however do not provide any light control.

AIM OF THE INVENTION

The invention aims to provide an apparatus for automatic control of incident solar radiation and also a method for the manufacture of that apparatus, wherein the apparatus comprises several shading elements arranged at intervals from each other in such a way that the area lying behind the shading elements at a predetermined angle of incidence is shaded and whereby manufacture of the apparatus can be carried out economically.

SOLUTION

The invention achieves its object by the following features:

(a) at least one side of the essentially opaque elements and/or the members supporting them are joined to at least one of the essentially transparent wall elements, whereby the essentially opaque elements and/or the members supporting them together with the essentially transparent wall elements form a cross-sectional area;

(b) the essentially opaque elements are reflective on at least one surface facing the sun;

(c) the incident solar radiation can be directed through the cross-sectional area by means of double reflection.

The manufacture of this apparatus may be performed by first placing the essentially opaque elements and/or the members supporting them at a predetermined angle to the essentially transparent wall elements and then joining them to the latter.

ADVANTAGES OF THE INVENTION

The invention controls incident solar radiation by allowing more radiation through in winter than in summer, and this control is effected by taking advantage of the differing angles of incidence of solar radiation. Special control mechanisms are rendered unnecessary thereby. The method of manufacture of the apparatus according to the invention makes on-line production simple without manual operations within the production process being necessary.

DESCRIPTION OF THE DRAWINGS

There are shown:

FIG. 3a a folding blind with transparent and opaque elements arranged one above the other;

FIG. 3b the opaque and transparent elements of the folding blind shown in FIG. 3a shown spread horizontally;

FIG. 4a a folding blind in which the bridge pieces are arranged between two flexible side walls;

FIG. 4b the folding blind of FIG. 4a shown folded up;

FIG. 7 an apparatus for control of incident solar radiation located on a sloping roof;

FIG. 8 the concentration factor depending on the angle of incidence of the solar radiation at different times of the year at a particular geographical place;

FIG. 1 shows a vertical section through a part of a sandwich assembly 1 consisting of two parallel side walls 2,3 made of transparent material and joined together by means of bridge pieces 4,5. The space between the two bridge pieces 4,5 is full of air or another gas; however it can also be evacuated. The sandwich assembly 1, which is located in front of a heat storing outer wall 6, can furthermore extend in either direction and contain additional bridge pieces, not shown in FIG. 1. Double sided reflecting foils 7,8 are on the upper surfaces of bridge pieces 45, which are made of a transparent, preferably plastics, material. There is an absorbent coating 11 on wall 6, in front of which the sandwich assembly 1 is located. A wall like this is also called a trombe wall. Bridge pieces 4, and walls 2,3 include an angle $\alpha$ the size of which is determined according to the latitude taking into account the direction the wall is facing and the climatic conditions prevailing where the sandwich assembly is being used. This angle $\alpha$ and the angle of incident solar radiation $\beta$ are in fixed relationship and this will be more fully discussed later.

At the end or at the beginning of a heating period set by the geographical location of the place currently in question, the following condition of incident radiation should apply: $\beta = 90° - \alpha = 2\alpha$, wherein $\tan \beta' = \tan \beta / \cos K$ and K is the angle of azimuth and $\beta$ is the angle of elevation. The values of $\beta$ and K are known and can be found in the literature (Alador and Victor Olgyay: Solar Control and Shading Devices, University Press, N.J.; Mieczyslaw Twarowski: Sonne und Architektur, Callwey Verlag, Munchen 1962). When $\beta = 2\alpha$ the sun is shining perpendicularly down onto the reflecting foil 8, shown by light ray 12, and is reflected back by the latter into the direction of radiation.

If at the end of a heating period the angle of incidence of solar radiation is $\beta > \beta_2$ it can be seen that all the light falling onto the metal foil 8 is reflected outwards; the wall 6 or an area adjacent to the side wall 3 thus remains completely shaded from the radiation.

Figure 1:
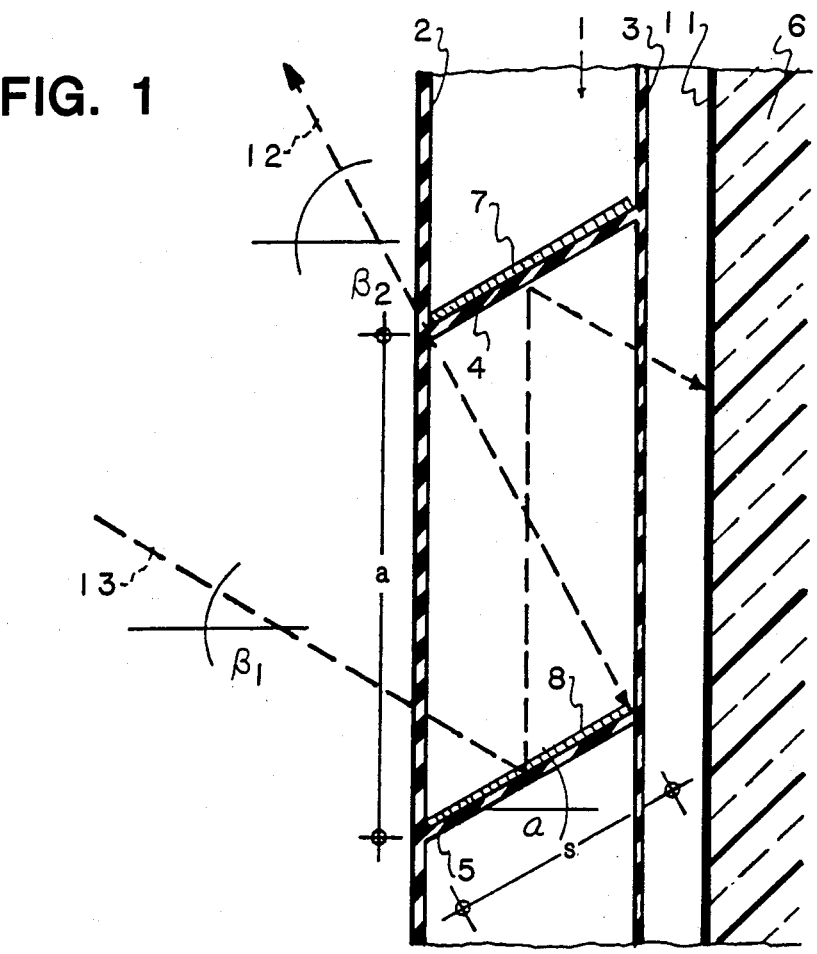
FIG. 1 a sandwich assembly with diagonally arranged reflective bridge pieces.

For a time after the begining of the heating period the relationship $\beta < \beta_2$ applies as the angle of incidence of the radiation decreases. One part of the solar radiation then passes directly through the sandwich assembly 1 onto the coating 11 of the wall 6, whilst another part falls onto the metal foil 8, from where it is reflected, partly directly onto the coating 11 and partly by reflection from the lower side of the foil 7. A further part is reflected back outwards by the foil 8. As the angle $\beta$ decreases the amount of light being reflected back decreases, whilst the amount of light falling directly or indirectly onto the coating 11 increases. When the angle of incidence of solar radiation $\beta$ corresponds to the angle of the bridge piece $\alpha$, as illustrated in FIG. 1 by the ray 13, then with all the angles of incident radiation $\beta < \beta_1$ all the sunlight is radiated directly or by means of a single or second reflection from the metal foils 8,7 onto the coating 11. The angles $\beta_2$ and $\beta_1$ thus define the limits at which the coating 11 is either totally in shade or receiving the entire radiation. The maximal interval $a_{max}$ between the bridge pieces 4,5 is determined in such a way that the ray 12 falls perpendicularly onto the end point of the metal foil 8 at the angle $\beta_2$ where the foil 8 touches the side wall 3. Thus ray 12 defines the shadow line. If the length of the bridge piece 5 is taken as s, then for the maximal interval $a_{max}$ between two bridge pieces 4,5 the relationship is $a_{max} = s/\cos(90° - \alpha) = s/\sin \beta_2$. For structural reasons or to achieve better visual screening the interval between the bridge pieces may be less than $a_{max}$.

Figure 2:
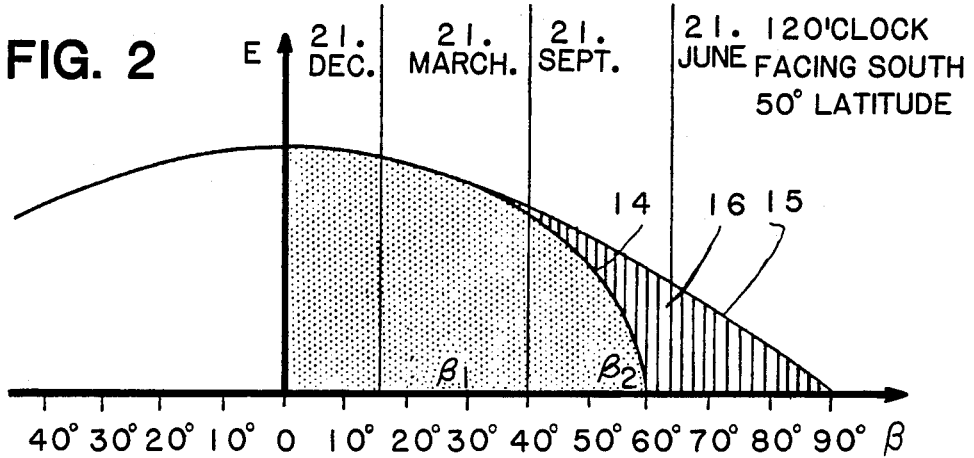
FIG. 2 the amount of incident solar radiation on a southerly aspect at 50° latitude at 12 noon depending on the angle of incidence of radiation at the time of year.

In FIG. 2 the amount of incident solar radiation E onto the side wall 2 or the side wall 3 as the case may be or onto coating 11 is shown. The curve 14 here shows the amount of incident solar radiation onto the coating 11 whilst the curve 15 shows the amount of incident solar radiation onto the side wall 2. Beginning when the angle of radiation is $\beta_1$ that is when $\beta > \beta_1$, an increase in the amount of radiation 16 from the side wall 3 by reflection is presented. When the angle of incidence of radiation $\beta = \beta_2$ then side wall 3 is in total shade. In FIG. 2 $\beta$ represents the angle of elevation of the sun at 50° latitude at 12 noon on a facade with a southerly aspect. It goes without saying that for other latitudes and other facades correspondingly altered curves will apply. To ascertain the actual amount of radiation the angle of the sun at azimuth should be taken into account. From FIG. 2 it can be seen that the sandwich assembly of FIG. 1, to the effect of which the representation of FIG. 2 is related, has a seasonal control effect without any further adjustment mechanisms being necessary. This control effect is in agreement with the desired seasonal heating and cooling processes, that is to say in summer cooling takes place and in winter heating takes place. With the sandwich assembly 1 shown in FIG. 1 temperature control effects for areas or radiation collectors are achieved in this way. Instead of an area behind the side wall 3 or instead of the wall 6 as shown in FIG. 1, other elements can be provided as and when desired, making use of incident light, for example photographic elements, water storage devices or solar collectors. The doubly reflective metal foils 7,8 on the bridge pieces 4,5 may be replaced by vaporised metal layers, of which the upper sides may be specularly reflective, whereas the underneath sides may even be diffusely reflective. The sandwich assembly 1 is preferably used as glazing to admit light to an interior space, for glass houses, decorative facades, roofs and the like. However in principle it can also be placed behind or in front of the window of a living area. If it is placed so that it admits light to an interior space the side wall 3 may be coloured, so that the incident radiated light may be somewhat softened and also so that the solar energy radiating into the room from the side wall 3 may be used for heating purposes.

An apparatus particularly suitable for location on the side of an interior space is shown in FIG. 3a.

There is shown here a folding blind 20 located behind a window 21 having two panes of glass 22,23 forming an insulating medium. By flexible tapes, of which FIG. 3a only shows only the tape 24, the individual folding elements of the blind 20 are folded in concert. These folding elements have two surface parts 25,26 and 27,28 of equal size, joined at their respective edges. The surface parts 26,28 have a rigid reflective element 29,30 on their upper sides, and this element may suitably consist of a double-sided reflecting foil made of metal or plastics, on a translucent plastics foil 31,32, made for example of PVC, PE, Polyester or PP.

FIG. 3b, in which the surface areas 25–28 are shown in the unfolded state, shows this still more clearly. It can be seen that the soft membrane-like surface parts 25,27 and the plastics foils 31,32 together form one single piece of foil with the reflective surfaces 29,30 on it. Despite the fact that materials of different strength are used the individual surface parts may be folded up very easily without breaking at the folds or without the reflective elements becoming crumpled. The way the folding blind 20 works may be compared with the way the sandwich assembly 1 works. In both cases reflective surfaces are provided facing the direction of the incident solar radiation, the surfaces being located at an angle $\alpha$ depending on the angle of incidence of solar radiation $\beta$. In the case of the sandwich assembly 1 reflective metal foils 7,8 are provided, whereas in the case of the folding blind 20 the reflective surfaces 29,30 are fuse-bonded. In both apparatuses air currents perpendicular to the main surfaces are cut off. The sun's rays 33,34 falling at the angles $\beta_1$ and $\beta_2$ through the panes 22,23 are reflected by means of the folding blind 20 in the same way as they are reflected by the sandwich assembly 1. In contrast to the sandwich assembly the folding blind 20 has no parallel side walls between which the bridge pieces are rigidly attached, but the folding elements are held together by the tapes 24 which have special attachments 35,36 on them connected to the reflective elements 29,30. The radiation reflected by means of the reflecting elements towards the interior area is either reflected onto the ceiling of the interior area not shown in FIG. 3a or onto the underneath side of the upper reflector 29, from where it gets into the interior space in the form of light or heat radiation 37. The underneath sides of the reflective layers 29,30 may also be coloured with a colour which will absorb a certain amount of light so that these coloured reflectors 29,30 may be cooled by convection currents and by reflecting heat into the interior space. In addition the surface part 27 may also be coloured, for example it may be gold. In FIG. 4a a further folding blind 40 is shown differing from the folding blind 20 of FIG. 3a essentially in that its reflective elements are not connected to only one transparent foil, but are located between two different transparent foils.

The film 41 facing the sun 39 and the film 42 facing the interior space consist of flexible and transparent material, of which the film 42 may be coloured. Between these films 41,42 the bridge pieces 43,44,45, which are reflective on both sides, are inclined at an angle $\alpha$, having the same relationships to the angle of incidence of solar radiation $\beta$ as have already been described in connection with FIGS. 1 and 3a. In the double walled folding blind 40 the connections between the films 41,42 and the bridge pieces 43, 44,45 are effected by gluing or welding strip shaped areas 49,54 of the films to the bridge pieces 43,44,45 to form hollow spaces 46,47,48.

In FIG. 4b there is shown a way of manufacturing the blind 40 as depicted in FIG. 4a by means of folding. To this end a three layered sandwich element 55 is formed having the reflective bridge pieces 43,44,45 in the middle and having outer layers consisting of films 41,42. The bridge pieces 43,44,45 are glued or welded to the films 41,42 at points 55–60, and this can be done in a continuously operating production line situation. Alternatively the bridge pieces 43,44,45 may also be joined to the films 41,42 at their edges.

Figure 5:
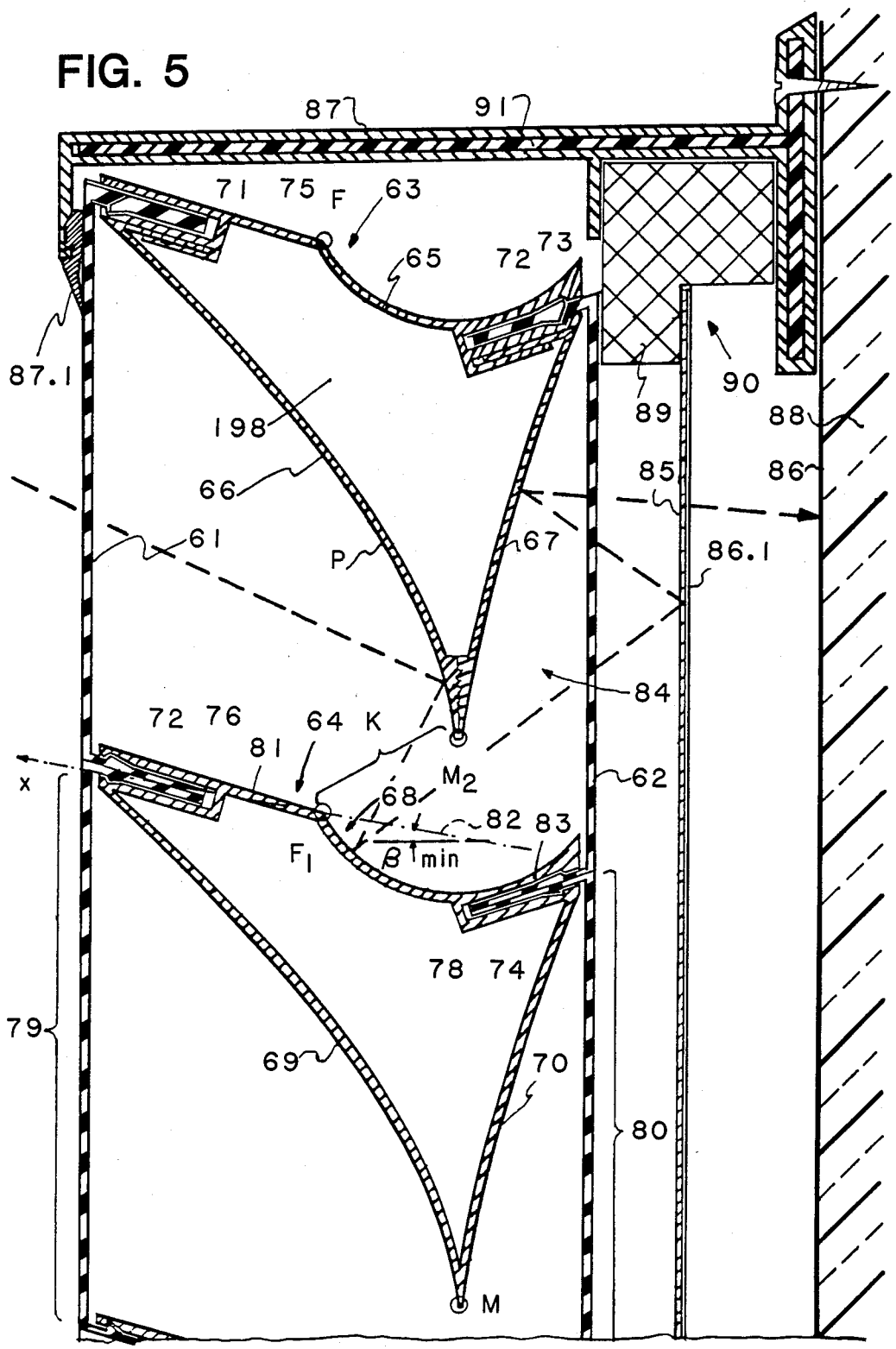
FIG. 5 an apparatus for control of incident solar radiation with mirror sections for concentrating light.

In FIG. 5 there is shown a further apparatus for automatic control of incident solar radiation having two semi-transparent wall elements 61,62 and several opaque mirror sections 63,64 located one above the other, and concentrating the solar radiation. These mirror sections 63,64 consist of three surfaces 65,66,67 and 68,69,70 as the case may be. Positive connections between the mirror sections 63,64 and wall elements 61,62 are made by fitting each of specially shaped projections 71,72,73,74 on the walls element's into its corresponding recess 75,76,77,78. As the projections 71,72,73,74 are so fitted the whole thing is assembled. The wall element 61 is exposed to direct solar radiation, whilst the wall element 62 is in shadow. The arrangement of two mirror sections above or below each other as the case may be defines an inlet cross-section 79, a concentration cross-section 79.1 and also an emission cross-section 80. The trough-shaped intake funnel is defined by the reflective area 66 and the reflective partial area 81. The reflective area 66 is parabolic in shape with its focus F at the end of the partial area 81 opposite it within the concentration cross-section 79.1. The axis 82 of the parabola indicated through the area 66 is inclined at an angle $\beta$, corresponding to the lowest angle of incidence of solar radiation $\beta_{min}$ to be trapped. The opposite side wall 81 is planar in form, however it may also be in the shape of a parabolic curve or of some other shape. Adjacent to the planar partial area 81 is a circular surface 83, whose centre M lies at the end point of the parabolic surface 66 in the concentration cross section K. The light is directed by this surface 83 into an emission funnel 84. The radiation falling onto the surface 67 is dispersed into the space behind the wall element 62, so that the radiant energy falling upon any collectors there is likewise unfocussed. Accumulation of heat in the region of concentrated radiation energy is thus avoided. The surface 67 acts as a reflector for a part of the radiation being reflected off the wall element 62 or off the absorber surface 86. The wall element 62, which by way of example may consist of glass, principally reflects a part of the light directed to it. As the surface 67 and the wall element 62 enclose a wedge-shaped space, the fraction of the light reflected by the wall element 62 onto the surface 67 is reflected back and forth several times between the surface 67 and the wall element 62, with the result that all the radiation directed by the concentrator onto the emission funnel 84 penetrates the wall element 62 without reflection losses. This permits the absorption surface 86 to have a smaller co-efficient of absorption, as the radiation reflected back by the surface 86 into the emission funnel 84 is radiated back onto the absorption surface 86. As the co-efficient of emission is the same as the co-efficient of absorption, the emission of a collector surface may be reduced with the aid of such an emission funnel 84 by lowering the absorption capacity when the co-efficient of total absorption is the same or higher. The shape of the emission funnel 84 also makes it possible to have several sheets of glass on the side of the interior space without loss of energy radiation as a result of reflection. Furthermore it is possible to put a heat mirror 86.1 on the side of the interior space on a foil 85. Heat mirrors of that kind, which for example can also serve as sun shields, are made by metallic vaporising processes known in themselves (Compare German Offenlegungsschrift No. 2238355) and usually also are capable of reflecting visible rays. The reflected part of the radiation is however reflected again by the multi-reflections in the emission funnel 84 with the result that loss of radiation is avoided despite the reflecting effect. The emission funnel 84 thus makes possible a high degree of energy gain and heat storage, which is why the apparatus shown in FIG. 5 is particularly suitable as a facade element for a light absorbing and heat storing wall.

The apparatus of FIG. 5 can also be enclosed in a framework 87 secured to an outer wall 88. The apparatus is possibly connected to the frame 87 by means of a rigid section 89. The transparent foil 85 is glued in a groove 90. The frame 87 may be an extruded PVC section with an aluminium section 91 inserted into it for stiffening. A special sealing lip 87.1 is provided on the wall element 61 to seal the frame 87.

Figure 6:
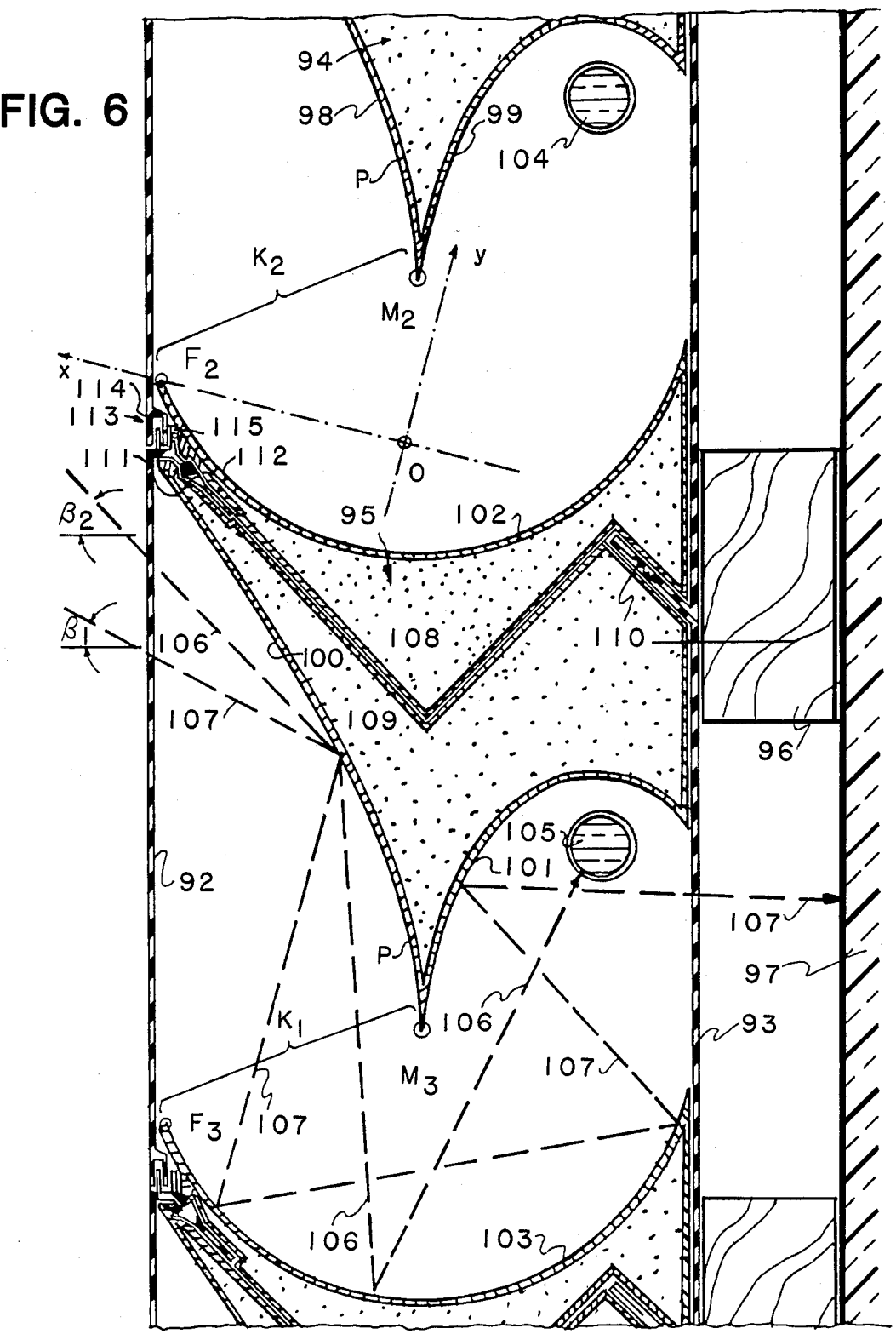
FIG. 6 an apparatus for control of incident solar radiation with mirror sections and absorber pipes provided therein.

In FIG. 6 there is shown a further apparatus for automatic control of incident solar radiation, comprising two transparent wall elements 92,93 between which mirror sections 94,95 are located. The apparatus is joined to an external wall 97 by means of a batten 96 acting as a support, with the result that special frame pieces are to a large extent rendered unnecessary. In this way the apparatus can be made to suit the style of the building where it is to be erected and desired dimensions may be obtained. Parabolic areas 98,100 and also areas 99,100 facing towards the interior area are mirrored on the surfaces facing towards the incident radiation on the mirror sections 94,95. Opposite the elements 98,99; 100,101 there may be an arcuate surface area 102,103. At the focus of the areas 99,100 there is an energy collector 104,105, taking the form of an absorber pipe with a heat transfer medium flowing through it. Because of the special configuration of the sections 94,95 these energy collectors 104,105 receive a constant amount of radiant energy largely irrespective of the angle of the sun according to the season of the year, whilst the amount of radiation on the wall element 93 decreases as the angle of the sun increases. In this way the desired automatic control effect with respect to the "heating" or "cooling" function is achieved. As a result of the location of the energy receivers 104,105 the cosine losses are used in such a way that the solar heating of the building or of the wall as the case may be automatically cuts out when the angle of radiation is great.

Of particular advantage is the circumstance that the energy receivers 104,105 on the one hand are located on the side of the mirror sections facing the interior space and on the other hand are covered from above by the curve of the parabolic profile sections 99,101. In this way the heat accumulates on the side of the interior space and cannot flow away to the irradiated side.

Focus points $F_2$ and $F_3$ as the case may be of the parabolic profiled elements 98,100 are right on the transparent wall element 92 and form the exit point for a circular mirror surface, formed by the profiled elements 102,103. The mirror surface is thus defined by the centre points $M_2$, $M_3$ at the end point of the parabolic surfaces 98, 100 and also by the concentration cross section regions $K_1, K_2$. The profiled elements 99,101 on the shaded side which curve around the absorber pipes 104,105 are empirically chosen so that the desired dispersion of the radiation relative to the varying angles of the sun occurs. The curve of the elements 99,101 thus achieved is parabolic. In FIG. 6 the path of the rays at angle $\beta_1$ and angle $\beta_2$ is shown, which clarifies the optical automatic control effect. The ray 106 at angle $\beta_2$ is thus directed onto the absorber pipe 105, whilst the ray 107 at angle $\beta_1$ is beamed through the wall section 93 after it has been reflected four times. The opaque elements 94,95 are linked by two parts 108,109 which may suitably be made of foamed polyurethane or polyisocyanurate.

The apparatus is mounted on the batten 96 to which the wall elements 92 are screwed and set. The absorber pipes 104,105 are then placed in position. In a further process the parts 108,109 are attached to a lug 110 in the wall element 93 and covered by the wall element 92. The outer wall element 92 is assembled from the bottom to the top, by fitting each lower surface 111 into its respective saw-toothed shaped detent 112. The upper surface 113 is joined to the lower surface of wall element 92 by means of a joint wherein two U-shaped connections 114,115 are fitted one into the other. This connection is of such a shape that the lower U connection 115 forms a gutter for the condensation running down from above. The outer edges of the U connections 114,115 are notched in places to enable condensation to run off. In FIG. 7 a further apparatus for control of the light radiation is shown, which is used preferably on steep roofs of dwellings and glass houses and other structures or as a decking. The purpose of this apparatus is, among other things, to provide concentration of the solar radiation, as for example is more fully expounded in German Offenlegungsschrift No. 28 23 252. The apparatus has two transparent wall elements 116,117, between which there are several opaque and reflective sections 118,119. By means of two sections 118,119 one radiation intake funnel 120,122 is formed with a radiation emission funnel 121,123 joined to it. The radiation intake funnel 120,122 is thus formed by two opposed parabolic parts 124,125 and 126,127 as the case may be, one of those parabolic parts 125,127 being essentially smaller than the other parabolic 124,126.

The entire apparatus is located above a decking 128 with an absorber surface 129 on it. Above the absorber surface 129 there are a first foil 130 and a second foil 131 serving as heat shields. Parallel to the second foil 131 the wall element 117 is located, which is reflective at predetermined points 132,133,134 on its underneath side. The radiation emission funnel 121,123 is in the shape of a parabola and fulfils the requirement that each ray 135 reflected from the radiation transmissive surface 117 is reflected back at least once onto the radiation transmissive surface 117. In the same way the light rays 136 and 137 which are reflected off the foils 130, 131 are reflected back by the radiation emission funnel 121,123 or the reflecting zone 133. The absorber 129 is a storage collector element on a decking 128, the apparatus being located some distance above it. The radiation emission funnel 121,123 fulfils the previously given condition when the wall element 117 is located perpendicular to the axis of the parabola, and when the focus $F_5$ lies at the end point of the mirror surface where the concentration cross section also is to be found. In winter, when the angle of radiation is small, light is let through by the apparatus shown in FIG. 7, whilst in summer it casts a shadow.

In FIG. 8 this connection is shown once again for latitude 50° at 12 noon. From curve 138 it can be seen that the concentration factor $C_F$ depends on the angle of radiation and thus on the time of year, shown by 21.12, 21.3, 21.9, 21.6. The chopping off of the curve in the region 139 is brought about by the continually increasing radiation, being radiated back from the region 140 between the points 141,142. A particularly large factor of concentration during winter and when the radiation angle is small is thus achieved by means of the region 140. The radiation reflected back in the region 140 falls at a very flat angle onto the outer wall element 116. This angle is designated $\alpha$ in FIG. 7. Corresponding to this flat angle of radiation the fraction of the radiation reflected off the wall element 116 is very high, with the result that radiation back into the concentration funnel is achieved. The actual concentration factor thus follows the curve parts 143,144.

The external wall element 116 may be in the form of a prism, wherein internal reflection of the beam of light from the side wall element 140 extends over a greater arc of the angle. The prism shape is then tapered, as indicated by the broken line 116.1.

Solar cells may be moulded into the wall element 117. In that case the parabolic shape of the radiation emission funnel 121,123 is especially advantageous, because reflective elements are as a rule located between the individual solar cell chips. The radiation falling onto the chips is reflected back from the said reflector elements into the radiation emission funnel 121,123 and beamed back thence onto the chips.

At this point attention is drawn to the fact that the mirror sections described herein are given by way of example only. Other mirror sections, such for example as those described in German patent application No. P29 42 497.3, may likewise be used.

Figure 9:
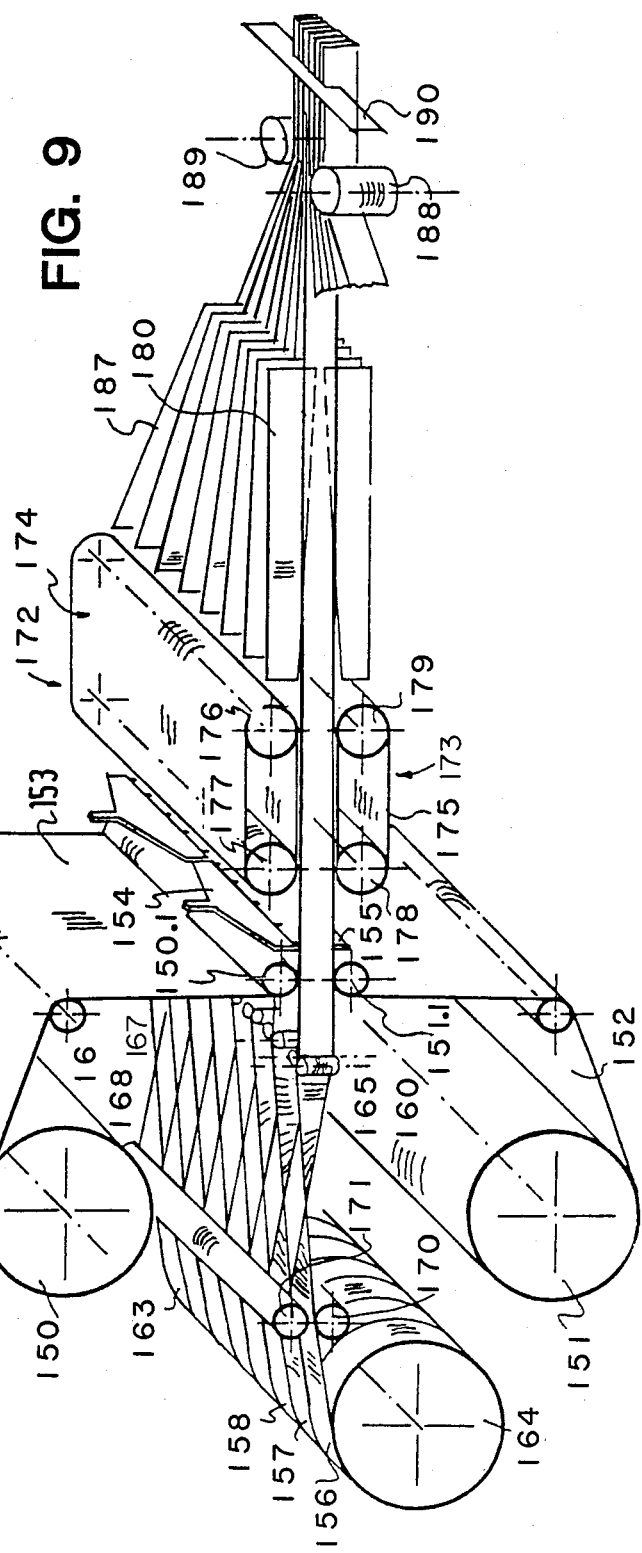
FIG. 9 a machine for manufacturing an apparatus according to the invention.

In FIG. 9 a possible method of manufacture of the apparatus according to FIG. 1 is shown. In the manufacture of such apparatuses the transparent wall elements 2,3 are wound off the rollers 150,151 in the form of sheets of plastics and are carried via the diverting rollers 150.1, 151.1 to the welding stations 154, 155 and are welded onto the side edges of the transverse bridge pieces. The said transverse bridge pieces are in sheet form at first and are wound off a wind-off roller 164. As the transverse bridge pieces are at a predetermined angle $\alpha$ to the wall element the plastics strips 156,163 which have already been made reflective are turned into the required positions. Two guide rolls 170,171 aid in positioning the sheets 156-163. Guide elements not shown in the Figure are located between the plastics sheets or bridge pieces 156-163, said elements preventing uncontrolled sideways movement of the bridge surfaces under the stress of the welding step which is done with sonotrodes. Having been welded together, the individual parts are now seized and drawn away by means of a conveyor 172,173, the conveyor consisting of an endless belt 174,175 and two cylindrical rollers 176,177; 178,179.

In cases where the sandwich assemblies manufactured by the mechanism illustrated in FIG. 9 are rigid, the individual plates behind the conveyors 172,173 are cut off by means of a cross cutter. On the other hand if they are flexible and intended for a folding blind they can be folded up by means of the guide rails 180-187 and cut to length by a roll press with rolls 188,189 on it by means of a cross cutter 190.

To stretch the edges of the blind while it is being folded without pulling it out of shape the edges of the blind are heated, for example, and as a result of temperature-induced spreading the desired extensive lengthening of the outer parts of the blind becomes possible. Instead of the guide rails 180-187 guide rollers may also be used, the said rollers pressing onto the folds, thus folding the blind up. The transparent wall elements 2,3 or the plastics sheets 152,153 as the case may be can also be laminated foils and, by way of example, may be in the form of two different layers, one layer being particularly adapted as a carrier and made for example of PVC, the other layer being particularly resistant to UV light. The bridge pieces may also be be made of such laminated foils.

The side edges may be chamfered to enable better welding of the transverse bridge pieces to the wall elements.

When a=s manufacture of the two piece assembly is particularly simple.

It should be borne in mind that the sheets 156-163 are already reflective before they are joined to the wall elements; that is to say, as a rule, reflective sheets are wound off the roller 164. At any rate it is not necessary to put completed sheets in their final form onto the roller; rather, it would also be possible not to separate a plastics sheet previously made reflective into several smaller strips by means of a lengthwise cutter until after it leaves the roller 164.

Figure 10:
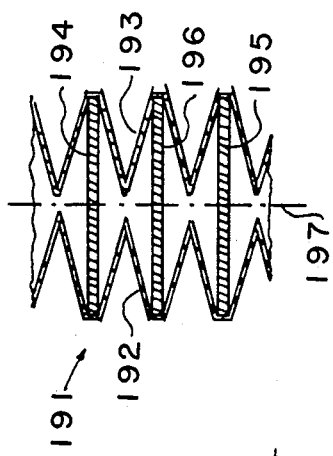
FIG. 10 a cross-section through a folding blind while being folded up in folding means.

FIG. 10 shows cutting of a folding blind 191 during the folding step. Here, the side walls 192,193 are kinked inwards between the bridge pieces 194,195,196, with the result that folding occurs along the axis 197.

I claim:

1. Apparatus for control of incident solar radiation, comprising essentially opaque elements (63, 64; 108, 109; 118, 119), which are arranged horizontally along their axis and are at intervals from each other along a vertical axis, each opaque element having a reflectng upper surface and reflecting lower surface wherein the reflective upper surface opaque element lies opposite the lower surface of the next adjacemt element, and the lower surface of the next adjacent element lies opposite the upper surface of a second adjacent element, thus admitting radiation between the upper surface of said opaque element and the lower of the adjacent element, characterized by the following chracteristics:
- each of the opaque elements is formed as a profile (63, 64; 108, 109; 118, 119) having mirror like surfaces;
- the upper and lower surfaces of each opaque element (63, 64; 108, 109; 118, 119) are different in shape;
- at least one portion of the lower surfaces (63, 69) of said mirror-profile is parabolic;
- the upper and lower surfaces of said mirror-profile established a radiation cross-section as well as a concentration cross-section (K, $K_1$, $K_2$); and
- the opaque elements (63, 64; 108, 109; 118, 119) are provided in between panel-like transparent elements (61, 62; 92, 93; 116, 117);
- whereby light reflected to an exterior of said apparatus is scattered by double reflection on the different contours of said upper and lower surfaces of said opaque elements.

2. Apparatus according to claim 1 characterized in that the upper surface of an essentially opaque element (119), has at least part (126), wherein the said part is parabolic in shape and the focus of the part (126) is located in the concentration cross-section, and in that the lower side of an essentially opaque element (119) consists of at least two parts (123, 125) wherein the one part (125) extends from the radiation inlet cross-section to the concentration cross-section in the second part (123) leaves from the concentration cross-section to the irradiation cross-section.

3. Apparatus according to claim 1, characterised in that the essentially transparent wall elements (61,62; 92,93; 116,117) are in the shape of prisms.

4. Apparatus for control of incident solar radiation, comprising a essentially opaque elements (63, 64; 108, 109; 118, 119), which are arranged horizontally along their axis and are at intervals from each other along a vertical axis, each opaque element haivng a reflecting upper surface and a reflecting lower, surface wherein the reflective upper surface opaque element lies opposite the lower surface of the next adjacent element, and the lower surface of the next adjacent element lies opposite the upper surace of a second adjacent element, thus admitting radiation between the upper surface of said opaque element and the lower of the adjacent element characterized by the following characteristics:
- each of the opaque elements is formed as a profile (63, 64; 108, 109; 118, 119) having mirror-like surfaces;
- the upper and lower surfaces of each opaque element (63, 64; 108, 109; 118, 119) are different in shape;
- at least one portion of the lower surfaces (63, 69) of said mirror-profile is parabolic;
- the upper and lower surfaces of said mirror-profile establish a radiation cross-section as well as a concentration cross-section (K, $K_1$, $K_2$);
- the opaque elements (63, 64; 108, 109; 118, 119) are provided in between panel-like transparent elements (61, 62; 92, 93; 116, 117);
- the upper surface of an essentially opaque element (119) has at least one part (126), wherein the set part is parabolic in shape and the focus of the part (126) is located in the concentration cross-section;
- the lower side of an essentially opaque element (119) consists of at least two parts (123, 125) wherein the one part (125) extends from the radiation inlet cross-section to the concentration cross-section and the second part (123) leads from the concentration cross-section to the radiation cross-section;
- the upper surface of one essentially opaque element (63, 64; 108, 109; 118, 119), has at least one part (65, 68; 102, 103) extending from the concentration cross-section (K) to the emission cross-section (80, 93);
- the said part (65, 68; 102, 103) has one surface which is shaped like the jacket of a cylinder with a midpoint (A) located in the concentration cross-section;
- the lower surface of an essentially opaque element (63, 64; 108, 109; 118, 119) consists of at least one part shaped like a parabola wherein the focus of the parabola ($F_1$–$F_3$) is located in the concentration cross-section of the upper surface of an adjacent element; and
- the end point of the parabolic part in the concentration cross-section forms the midpoint (M) of the surface shaped like the jacket of a cylinder of the upper surface of an adjacent element.

5. An apparatus for automatic control of incident radiation with transparent wall elements (61, 62; 92, 93, 116, 117) and opaque elements (63, 64; 108, 109; 118, 119) which are arranged in parallel and having a distance from each other, said opaque elements (63, 64; 108, 109; 118, 119) being arranged and continuously extending between the transparent wall elements (61), 62; 92, 93; 116, 117) and having at least a reflecting area directed to the incident radiation wherein two opaque elements (63, 64; 108, 109; 118, 119) form in a radiation section and an emission section characterized in that said apparatus for automatic control of incident radiation is located vertically or at an angle to function as a separating and heat insulating wall between an interior and an exterior space, and in that a wall is built within a framework or built up from separate sections and mounted as a facade on a support, the upper surface of a first opaque element (81, 83) and the lower surface of a second opaque element (66, 67) form a concentration section (K) which is located between the radiation section and the emission section wherein the contour of the upper surface of an opaque element (63, 64; 108, 109; 118, 119) differs from the contour of the lower surface of said opaque elements (63, 64; 108, 109; 118, 119).

6. An apparatus for automatic control of incident radiation with transparent wall elements (61, 62; 92, 93; 116, 117) and opaque elements (63, 64; 108, 109; 118, 119) which are arranged in parallel and having a distance from each other, said opaque elements (63, 64; 108, 109; 118, 119) being arranged and continuously extending between the transparent wall elements (61, 62; 92, 93; 116, 117) and having at least a reflecting area directed to the incident radiation wherein two opaque elements (63, 64; 108, 109; 118, 119) form in a radiation section and an emission section characterized in that the transparent wall element (61, 62; 92, 93; 116, 117) and the essentially opaque elements (63, 64; 108, 109; 118, 119) are extruded from plastic material and assembled into a wall-like structure by means of interlocking and snap fitting fastening, the upper surface of a first opaque element (81, 83) and the lower surface of a second opaque element (66, 67) form a concentration section (K) which is located between the radiation section and the emission section wherein the contour of the upper surface of an opaque element (63, 64; 108, 109; 118, 119) differs from the contour of the lower surface of said opaque elements (63, 64; 108, 109; 118, 119).

7. An apparatus for automatic control of incident radiation with transparent wall elements (61, 62; 92, 93; 116, 117) and opaque elements (63, 64; 108, 109; 118, 119) which are arranged in parallel and having a distance from each other, said opaque elements (63, 64; 108, 109; 118, 119) being arranged and continuously extending between the transparent wall elements (61, 62; 92, 93; 116, 117) and having at least a reflecting area directed to the incident radiation wherein two opaque elements (63, 64; 108, 190; 118, 119) form in a radiation section and an emission section characterized in that the upper surface of a first opaque element (81, 83) and the lower surfaces of a second opaque element (66, 67) form a concentration section (K) which is located between the radiation section and the emission section wherein the contour of the upper surface of an opaque element (63, 64; 108, 109; 118, 119) differs from the contour of the lower surface of said opaque elements (63, 64; 108, 109; 118, 119) and the upper surface of said first opaque element and lower surface of said second opaque element establish a sluice for radiation at the one side of which radiation can enter whereas the other radiation can leave.

8. Apparatus according to claim 7, charcterized in that at least one energy transformer is provided within the mirror system, said energy transformer transforming the optical energy into another form of energy and the energy transformer is an absorber pipe or the like and is provided in the region of the lower surface of the essentially opaque element (63, 63; 108, 109; 118, 119), and also behind the concentration cross-section on the inner side in the region of the radiation cross-section.

9. Apparatus according to claim 7, characterised in that the irradiation cross-section (80) of the light radiation sluice is larger than the concentration cross-section.

10. An apparatus for automatic control of incident radiation with transparent wall elements (61, 62; 92, 93; 116, 117) and opaque elements (63, 64; 108, 109; 118, 119) which are arranged in parallel and having a distance from each other, said opaque elements (63, 64; 108, 109; 118, 119) being arranged and continuously extending between the transparent wall elements (61, 62; 92, 93; 116, 117) and having at least a reflecting area directed to the incident radiation wherein two opaque elements (63, 64; 108, 190; 118, 190) form in a radiation section and an emission section characterized in that the upper surface of a first opaque element (81,83) and the lower surface of a second opaque element (66, 67) form a concentration section (K) which is located between the radiation section and the emission section wherein the contour of the upper surface of an opaque element (63, 64; 108, 109; 118, 119) differs from the contour of the lower surface of said opaque element (63, 64; 108, 109; 118, 119), the opaque elements are made from plastic by expanding the plastic into a mold cavity whose internal dimensins correspond to the external dimensions of the opaque elements to make a hollow piece and foaming the hollow piece.

11. An apparatus, according to claim 10 wherein the opaque elements further include a metalized foil which is added to the opaque elements by providing the metalized foil in the mold cavity before the plastic is expanded and foamed.

12. Apparatus according to claim 10, characterised in that the light entering through said radiation-section when at one angle of incidence shines into a concentration section, and in that the said angle of incidence increases as the angles of elevation $\beta$ of the sun decrease, whereby when the angles of elevation $\beta$ are smaller higher concentration factors may be achieved, and when the angles of elevation $\beta$ are greater smaller factors of concentration may be achieved or shading of the concentration or radiation section may be achieved.

13. Apparatus according to claim 10, characterised in that the upper surface of an essentially opaque element 63,64; 108,109; 118,119), consists of at least two parts, wherein the first part (81, 75) is one wall element of a radiation concentration funnel, and extends from the radiation section (79) to the concentration section (K), and wherein the second part extends from the concentration section (K), as far as the radiations section.

14. Apparatus for automatic control of incident radiation with transparent wall elements (61, 62; 92, 93; 116, 117) and the opaque elements (63, 64; 108, 109; 118, 119) which are arranged in parallel and having a distance from each other, said opaque elements (63, 64; 109; 118, 119) being arranged between the transparent wall elements (61, 62; 92, 93; 116, 117) and having at least a reflecting area directed to the incident radiation, wherein two opaque elements (63, 64; 108, 109; 118, 119) form an irradiation section and an emission section characterized in that the transparent wall elements (61, 62; 92, 93; 116, 117) are made by:
 rolling off a first sheet of material (153) from a first roll off station;
 rolling off a second sheet of material (152) from a second roll off station syncronously with the first sheet of material (153);
 rolling of strips of material (156 through 163) from a third roll off station (164) synchronously with the first and second sheets of material (152, 153) and positioned at a predetermined angle to said first and second sheets of material (152, 153);
 joining the strips of material (156 through 163) to the first and second sheets of material (152, 153); and
 cutting the strips of material (156 through 163) and the first and second sheets of material (152, 153) joined to them to length by cutting devices.

15. An appaatus for automatic control of incident light, comprising transparent wall elements spaced from each other, opaque elements which are arranged in parallel, spaced from one another, located between the transparent wall elements and have at least a reflecting area facing the irradiated light and wherein two opaque elements form an irradiation section and an emission section, the upper surface of a first opaque element and the lower surface of a second opaque element form a concentrated section which is located between the irradiation and emission section, the upper surface of an opaque element differs from the contour of the lower surface of said element, the opaque elements continuously extend from a first transparent wall element to a second transparent wall element, all of the opaque elements are formed with a profile which is unsymmetrical in section with respect to an axis parallel to the transparent wall and with respect to an axis vertical to said transparent walls with said profile sections having all the same shape so that the concentrating sections between the opaque elements are all identical, at least one side of the opaque elements comprise a concave mirror, at least one side of the opaque elements comprise a reflector directed to the inner room and a reflector directed to the outer room and the volume between one of the concentrating sections and the transparent wall element located at the irradiation section is greater than the volume between said concentrating section and the transparent wall element located at the emission section.

* * * * *